(12) United States Patent
Reshef et al.

(10) Patent No.: US 8,520,100 B2
(45) Date of Patent: Aug. 27, 2013

(54) CMOS IMAGE SENSOR PIXEL WITHOUT INTERNAL SAMPLE/HOLD CIRCUIT

(75) Inventors: Raz Reshef, Tel-Aviv (IL); Erez Sarig, Hertzeliya (IL); Aviad Haber, Netania (IL); Shay Alfassi, Kiriat Tivon (IL); Guy Yehudian, Kfar Saba (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 980 days.

(21) Appl. No.: 12/553,880

(22) Filed: Sep. 3, 2009

(65) Prior Publication Data

US 2011/0050874 A1    Mar. 3, 2011

(51) Int. Cl.
   *H04N 5/217*   (2011.01)
(52) U.S. Cl.
   USPC .............................. 348/241; 348/65
(58) Field of Classification Search
   USPC ............. 348/65, 73, 75, 76, 241–243, 371, 348/373–376
   See application file for complete search history.

(56) References Cited

U.S. PATENT DOCUMENTS

| | | | |
|---|---|---|---|
| 6,982,740 B2 * | 1/2006 | Adair et al. | 348/76 |
| 7,671,908 B2 * | 3/2010 | Lee | 348/241 |
| 7,777,170 B2 * | 8/2010 | Murakami et al. | 250/208.1 |

* cited by examiner

*Primary Examiner* — Timothy J Henn
(74) *Attorney, Agent, or Firm* — Bever, Hoffman & Harms, LLP; Patrick T. Bever (57) ABSTRACT

A very small area CMOS image sensor, e.g., for an endoscopic system, includes only four pads (power, ground, digital in, analog out), and includes an array of 4T pixels and associated control circuitry for performing correlated double sampling (CDS) to generate analog reset level and analog signal level values associated with light detected by photodiodes in each pixel. Instead of processing the analog values on-chip, the analog reset values and analog signal values are transmitted in separate sets one row at a time along with interleaved synchronization signals by way of a single analog contact pad, e.g., to a host device of an endoscopic system, which uses the synchronization signals to reconstruct the sensor's internal clock in order to process the analog values. An endoscope housing incorporating the CMOS image sensor thus requires only four wires.

13 Claims, 5 Drawing Sheets

CMOS IMAGE SENSOR PIXEL WITHOUT INTERNAL SAMPLE/HOLD CIRCUIT

FIELD OF THE INVENTION

This invention relates to CMOS image sensors, and more particularly to very small area CMOS image sensors that are used, for example, in medical applications.

BACKGROUND OF THE INVENTION

Sensor arrays are used, for example, in video cameras, and generally include a two dimensional array of pixels that is fabricated on a substrate. Each pixel includes a sensing element (e.g., a photodiode) that is capable of converting a portion of an optical (or other radiant source) image into an electronic (e.g., voltage) signal, and access circuitry that selectively couples the sensing element to control circuits dispose on a periphery of the pixel array by way of address and signal lines. The access circuitry typically includes metal address and signal lines that are supported in insulation material deposited over the upper surface of a semiconductor substrate, and positioned along the peripheral edges of the pixels to allow light to pass between the metal lines to the sensing elements through the insulation material. Most image sensors typically contain a large number (e.g., millions) of pixels which transform photons coming from a photographed scene or other optical image source into a large number of corresponding voltage signals, which are stored on a memory device and then read from the memory device and used to regenerate the optical image on, for example, a liquid crystal display (LCD) device.

There are two main types of image sensors: Charge-Coupled Device ("CCD") sensors and Complementary Metal Oxide Semiconductor ("CMOS") sensors. Early CMOS sensors suffered from poor light sensitivity and high noise levels that limited their usefulness, and the majority of early image sensors were of the CCD type. Recent advances in CMOS technology have led to the development of high performance CMOS sensors that are quickly replacing CCDs in a host of other applications, particularly in those where speed, power consumption, size, and on-chip functionality are important factors.

Endoscopy is a minimally invasive diagnostic medical procedure that is used to assess the interior surfaces of an organ by inserting an endoscope into the body. There are several types of endoscopes, but the present invention is particularly directed to endoscopes that have a flexible tube having a very small image sensor at its tip, which is connected to a host instrument device by a long cable (e.g., 14 feet) made up of a set of electrical wires that extend between the device and the sensor through the tube. Such endoscopes utilize small image sensors that are mounted in the tip, and are connected by wires to a host measurement device that stores image information generated by the image sensor. The endoscope often includes small working tools along with the image sensor at the tip. Such endoscopes are required to enter smaller and smaller organs such as tiny blood vessels, and thus the image sensors utilized in endoscopes are becoming smaller and smaller. When the tip is inserted inside a patient's body, the image sensor becomes the doctor's "eyes" within the patient's body. The challenge in this case is for the image sensor to be small enough to fit together with the rest of working tools inside very narrow cable. In addition, there is a need to reduce the number of contact pads on the image sensor in order to minimize the number of wires within the tube.

What is needed is a low cost, very small area CMOS image sensor with that overcomes the problems associated with conventional very small area image sensors.

SUMMARY OF THE INVENTION

The present invention is directed to a CMOS image sensor that facilitates a very small area chip size while maintaining high image quality and high dynamic range by directly transmitting to a host device analog values generated by standard four transistor (4T) pixels, thereby eliminating large column capacitors and other area-consuming circuitry utilized by conventional image sensors to perform on-chip A/D conversion of the analog CDS values. Utilizing the 4T pixel architecture facilitates high image quality and high dynamic range by supporting true correlated double sampling (CDS) that eliminates pixel KT/C noise. Eliminating the large column capacitors and other area-consuming circuitry used in conventional sensors facilitates minimizing the chip size while maintaining a large area for the pixel array, thereby allowing the production of CMOS image sensors having width/length dimensions of 0.7 mm or less, and more preferably having width/length dimensions of 0.5 mm or less, thereby allowing the CMOS image sensors to fit, for example, into a narrow tube such as those used for endoscopy applications. In addition, forming the image sensors of the present invention using low cost CMOS fabrication techniques minimizes production costs in comparison with conventional CCD sensors, thereby allowing the final product to be used one-time before being thrown out and replaced with a new one.

According to an embodiment of the present invention, the CMOS image sensor further maximizes the chip area available for the pixel array by reducing the number of contact pads through the use of an on-chip clock and a novel output synchronization protocol. The contact pads of any IC take up significant chip space because they have to be large enough to facilitate wire-bonding or other connection to external circuitry (e.g., a printed circuit board or wire). The present invention facilitates reducing the number of contact pads to four (i.e., a power-in (VDD) pad, a ground pad, a digital input pad, and an analog output pad) by utilizing an on-chip-only clock signal that must be reconstructed externally (i.e., by the host system) in order for the external A/D converter to sample the sensor data correctly. The digital input pad allows for external control over sensor light exposure time per frame. The novel output synchronization protocol is used in external clock reconstruction by providing synchronization signals that are interleaved with and identify the start/end of analog signal transmissions. In one embodiment, these synchronization signals include a "Start of Frame" signal to identify the beginning of a new frame, a "Start of Row" signal to identify the beginning of a new row, and a "Middle of Row" signal to delineate between the analog reset values and the analog signal values transmitted for each row. In a specific embodiment, "Start of Blue (Even) Row" and "Start of Red (Odd) Row" synchronization signals are used to distinguish between rows that differ, for example, due to Bayer pattern color implementation (this may be important because the sensor is capturing images continuously). According to another embodiment of the present invention, the synchronization signals are distinguished from each other by comprising a unique pulse width or a unique analog signal (voltage or current) level.

According to another embodiment of the present invention, an endoscope system includes an external (host) device that is connected to an image sensor by an elongated cable housing four wires that are respectively connected to the contact pads of the image sensor. The host device includes means for generating the digital input signal in response to control signal supplied from a user, and an (external) A/D converter that samples the pixel data at a faster rate than that of the sensor internal clock in order to determine the sensor clock rate. Analog voltage signals generated by the image sensor pixels are converted to current signals to facilitate transmission over the elongated cable with minimal loss, and then reconverted to voltage signals by the host device before A/D conversion and further processing. By knowing how many analog signals to expect between each synchronization signal, the A/D converter is able to reconstruct the sensor internal clock, thereby facilitating analysis of the CDS values for each pixel.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in CMOS image sensors, and more particularly to very small area CMOS image sensors. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
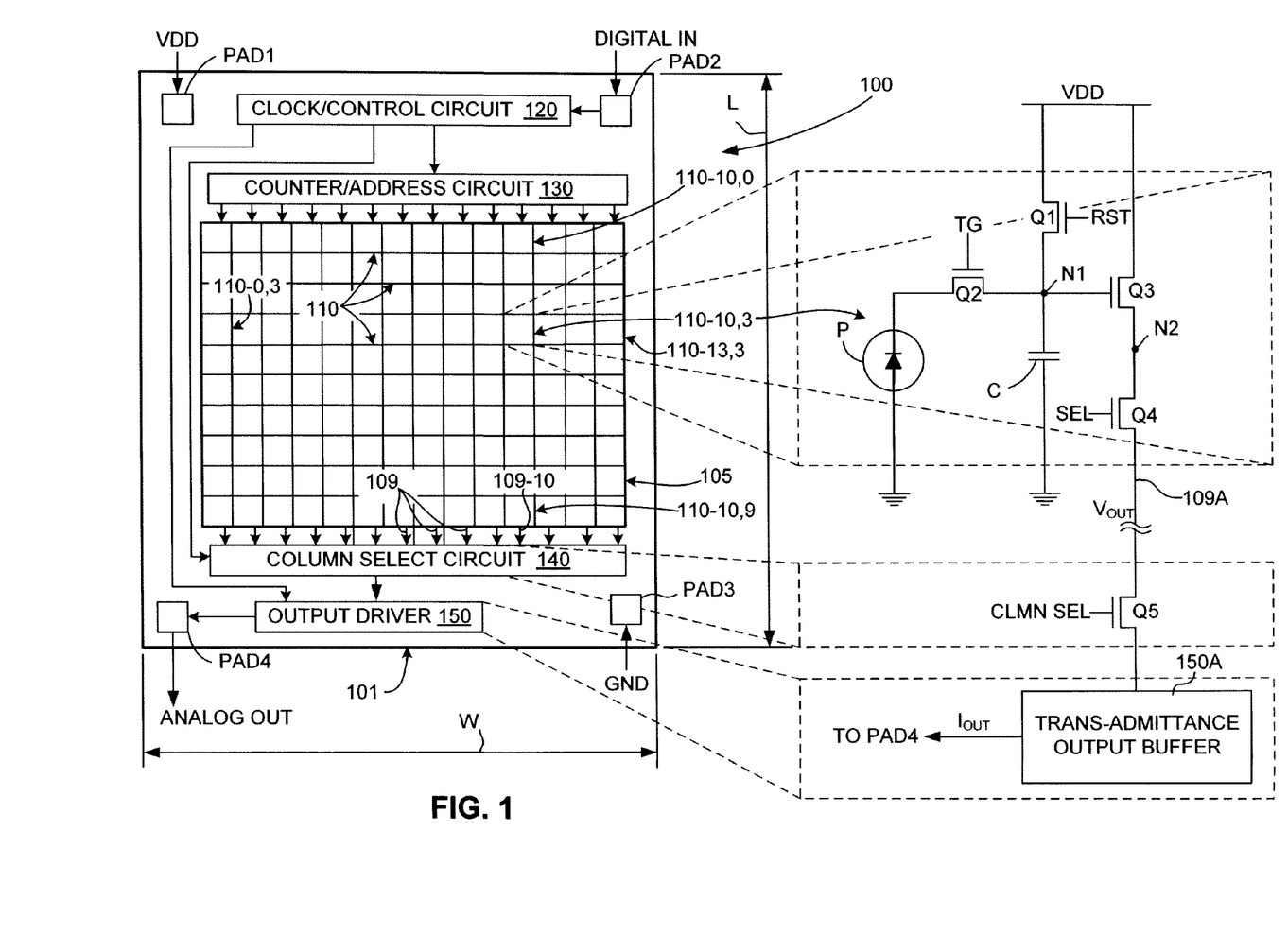
FIG. 1 is a simplified perspective diagram showing a CMOS image sensor according to an embodiment of the present invention.

FIG. 1 is a simplified diagram showing simplified a very small area CMOS image sensor 100 formed in accordance with a generalized embodiment of the present invention. CMOS image sensor 100 is similar to conventional CMOS image sensors in that it is formed on a semiconductor (e.g., monocrystalline silicon) substrate 101 using CMOS fabrication techniques, and includes a pixel array 105 including pixels 110 arranged in rows and columns, and control circuitry (i.e., a clock/control circuit 120, counter/address circuitry 130, a column select circuit 140 and an output amplifier 150) that accesses pixels 110 by way of associated metal control lines (not shown) passing between the rows and columns of pixel array 105.

In the present embodiment, pixel array 105 is arranged such that the columns of pixels 110 are aligned vertically, and the pixel rows are aligned horizontally. For example, pixels 110-10,0, 110-10,3, and 110-10,9, which are aligned vertically in FIG. 1, form one of fourteen pixel columns, and pixels 110-0,3, 110-10,3, and 110-13,3, which are arranged horizontally, form one of ten pixel rows. As described in additional detail below, the pixel rows are accessed sequentially during readout operations by way of control signals generated by counter address circuit 130, and the analog reset/signal values generated by each pixel are transmitted on column signal lines 109 to column select circuit 140. For example, during a first time period all of the pixels in the first row of pixel array 105 (e.g., pixel 110-10,0) are accessed, and analog values generated by the first row are transmitted onto associated column signal lines (e.g., signal line 109-10). Those skilled in the art will recognize that pixel array 105 is shown with a small number of pixels for explanatory purposes, and that an actual sensor formed in accordance with the present invention would include between 50,000 and 100,000 pixels.

A simplified pixel 110-10,3, which is exemplary of all pixels 110, is shown in an enlarged fashion in the upper right portion of FIG. 1. Similar to conventional 4T CMOS image sensors, each pixel 110 of CMOS image sensor 100 (e.g., pixel 110-13) includes a CMOS pinned photodiode P, a reset select transistor Q1, a transfer gate transistor Q2, a source-follower transistor Q3, and a select transistor Q4. Reset transistor Q1 is connected between system voltage supply VDD and a first internal node N1. CMOS photodiode P is fabricated on a semiconductor (e.g. silicon) substrate using known techniques, and is coupled to node N1 by way of transfer gate Q2, and is controlled by transistors Q1 and Q2 to generate a photodiode voltage at a first node N1 during read operations in accordance with the methods described below. Parasitic capacitance of Q1,Q2,Q3 at node N1 (represented by capacitance C in FIG. 1) stores charges transferred from photodiode P and reset transistor Q1. Source-follower transistor Q3 is connected between system voltage supply VDD and a second internal node N2, and is controlled by a voltage present on internal node N1 to generate a pixel output signal at node N2. Select transistor Q4 is connected between associated column signal line 109-10 and node N2, and receives a select control signal SEL during the read operations that couples node N2 to signal line 109-10. The read operations mentioned above are initiated using select control signals and other control signals generated by clock/control circuit 120 and column/address circuit 130 according to timing characteristics described in further detail below, and transmitted to pixels 110 utilizing addressing schemes understood by those skilled in the art.

According to an aspect of the present invention, in order to facilitate the production of very small area image sensors (i.e., such that CMOS image sensor 100 has width W and length L dimensions of 0.7 mm or less) while maintaining high image quality and high dynamic range, analog image detection values generated by pixels 110 are directly transmitted to a host system (e.g., host device 210, which is described below with reference to FIG. 2), thereby eliminating large column capacitors and other area-consuming circuitry utilized by conventional image sensors to perform on-chip A/D conversion of the analog CDS values. For example, as indicated in FIG. 1, column select circuit 140 includes a column select transistor Q5 that is controlled by a column select control signal CLMN SEL to pass analog signals generated by each pixel (e.g., pixel 110-10,3) directly from its associated column signal line (e.g., line 109-10) to output driver 150. In the preferred embodiment, output driver 150 is implemented using a trans-admittance output buffer 150A that converts the analog voltage output value $V_{OUT}$ to an analog current output value $I_{OUT}$ using techniques known to those skilled in the art. The amplified output current $I_{OUT}$ is then transmitted onto an output pad (e.g., PAD 4). That is, when pixel 110-10,3 generates an analog reset or signal value at node N1, that analog value is simultaneously amplified by source-follower transistor Q3 and passed by select transistor Q4 and column select transistor Q5 to trans-admittance output buffer 150A, from which it is converted to output current $I_{OUT}$ and substantially simultaneously transmitted to output pad PAD 4 for transmission to a host device. Utilizing the 4T pixel architecture illustrated in FIG. 1 facilitates high image quality and high dynamic range by supporting true correlated double sampling (CDS) that eliminates pixel KT/C noise. Eliminating the large column capacitors and other area-consuming circuitry used in conventional sensors facilitates minimizing the size (i.e., width and length) of chip 101 while maintaining a relatively large area for pixel array 105. Further, using trans-admittance output buffer 150A to convert the output voltage $V_{OUT}$ to output current $I_{OUT}$ before transmission to the host system by way of output pad PAD 4 facilitates transmission over a long cable without significant loss of signal.

According to another aspect of the present invention, in order to further minimize chip size and maximize the area available for pixel array 105, the number of contact pads is reduced to four (i.e., contact pads PAD1 to PAD4) through the use of an on-chip clock and a novel output synchronization protocol. The contact pads of any IC take up significant chip space because they have to be large enough to facilitate wire-bonding or other connection to external circuitry (e.g., a printed circuit board or wire). The present embodiment facilitates reducing the number of contact pads to four by providing clock/control circuit 120 with an on-chip-only clock generation circuit that provides an independent on-chip clock signal according to known techniques. Specifically, contact pad PAD1 receives system voltage VDD and contact pad PAD3 receives a ground potential GND that are utilized by the various circuits of image sensor 100. As mentioned above, contact pad PAD4 serves as the analog output pad). In accordance with the present embodiment, contact pad PAD2 receives a digital control signal DIGITAL IN, which facilitates external control over sensor light exposure time per frame. Of course, utilizing an independent (on-chip-only) clock signal that is independent of the clock signals generated by a host device (e.g., host device 210 in FIG. 2) requires that the sensor clock be reconstructed externally (i.e., by the host device) in order for an external A/D converter to sample the sensor data correctly. As described in additional detail below, this clock reconstruction process is achieved by sampling the analog output signal transmitted on output pad PAD4 using an A/D converter having a much faster clock signal rate than that of the sensor clock, and through transmitting periodic synchronization signals on analog output pad PAD4 that are interleaved with the analog pixel signal bursts. By knowing the number of analog signal values in each burst to expect between each synchronization signal, the host device is able to calculate the sensor clock speed and thus reconstruct (identify) the analog signal values for further processing. By interleaving the synchronization signals with the analog signal bursts, the present invention uses only one contact pin (PIN4) to transmit both measured values and information necessary to accurately identify the measured values at the host device.

Figure 2:
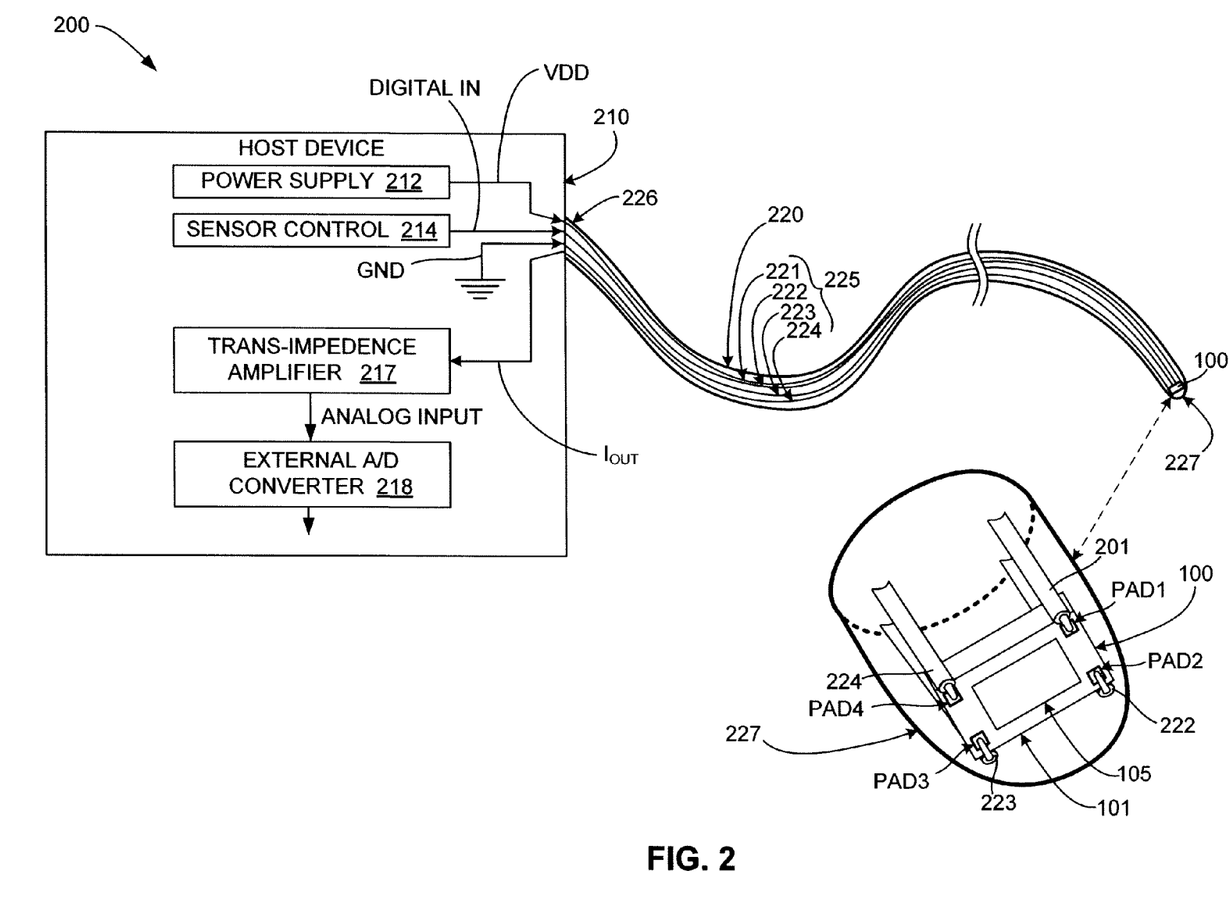
FIG. 2 is a simplified diagram showing an endoscopic system incorporating the CMOS image sensor of FIG. 1 according to a specific embodiment of the present invention.

FIG. 2 is a simplified diagram showing an endoscopic system 200 incorporating CMOS image sensor 100 (described above with reference to FIG. 1) according to a specific embodiment of the present invention. Endoscope system 200 includes an external (host) device 210 and an endoscope (probe) 220 having a tube-like cover that houses an elongated cable 215 formed by four wires 211 to 214. Endoscope 220 has a fixed end 226 that is connected to host system 210, and a transparent free end (tip) 227 that houses image sensor 100 such that pixel array 105 faces outward according to known techniques. As indicated by the enlarged view of tip region 227 in FIG. 2, the ends of wires 211 to 214 are respectively soldered or otherwise connected to contact pads PAD1 to PAD4. Host system 210, which may be a PC or workstation modified to function in the manner described herein, is electrically connected to image sensor 100 by way of wires 211 to 214 in the manner depicted in FIG. 2. In particular, a power supply 212 transmits system voltage VDD to contact pad PAD1 of image sensor 100 by way of wire 221, and a ground potential GND to contact pad PAD3 of image sensor 100 by way of wire 223. A sensor control circuit 214 generates digital control signal DIGITAL IN according to a user's input, and transmits signal DIGITAL IN to contact pad PAD2 of image sensor 100 by way of wire 222. Finally, analog output values and synchronization signals generated by image sensor 100 on output contact pad PAD4 are transmitted to an external analog-to-digital (A/D) converter 218 for processing in the manner described below. As mentioned above, in the preferred embodiment these analog output values are transmitted from image sensor 100 to the host device 210, through cable 220, in the form of current signals $I_{OUT}$. In one embodiment, the cable end connected to host device 210 is held at virtual ground of a trans-impedance amplifier 217 that is connected to receive current signals $I_{OUT}$, and serves to reconvert these signals to analog voltage signals using known techniques. Therefore, the analog signals can be transmitted over a relatively long (e.g., 14') cable 220 to host device 210 without significant loss.

Figure 3:
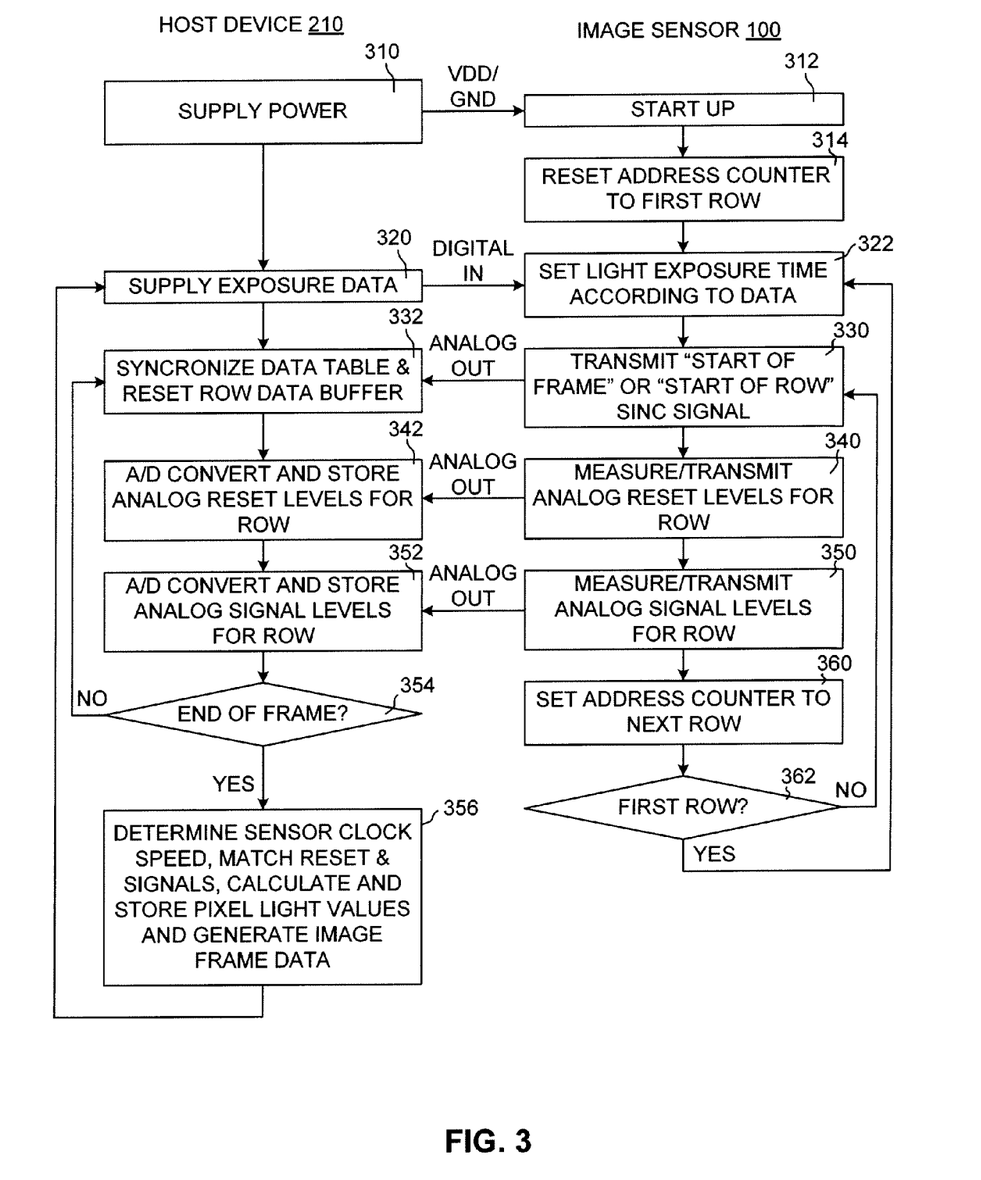
FIG. 3 is a flow diagram showing generalized functions performed by the host device and image sensor of the endoscopic system of FIG. 2 during operation according to another embodiment of the present invention.

FIG. 3 is a flow diagram showing generalized functions performed by host device 210 and image sensor 100 of endoscopic system 200 (see FIG. 2) during operation according to another embodiment of the present invention. At start up host system 210 supplies power VDD and ground GND to device 100 (block 310) by way of wires 221 and 223 (see FIG. 2), causing clock/control circuit 120 of image sensor 100 to perform a predetermined start up routine (block 312) according to known methods. At the end of the start up routine, clock/control circuit 120 resets the address counter to the first row of pixel array 105 (shown in FIG. 1). Initial supply exposure data is provided by way of digital control signal DIGITAL IN on wire 222 during or after the start image routine, which is utilized by clock/control circuit 120 to set an exposure (integration) time period for image sensor 100 (block 322), as described in additional detail below. Image sensor 100 then begins generating image data using known CDS methodology utilizing the provided exposure time period.

According to an embodiment of the invention, the novel output synchronization protocol used to reconstruct the image sensor clock includes transmitting a "Start of Frame" synchronization signal (block 330) each time the first row of pixels is read and associated analog reset values are transmitted to host device 210. Host device 210 uses the "Start of Frame" synchronization signal, for example, to synchronize the data table and reset the row data buffer (block 332). After transmitting the "Start of Frame" synchronization signal, image sensor 100 begins to generate and transmit analog reset values from the first row of pixels (block 340), which are transmitted as current values as described above and received and stored by host device 210 (block 342). After transmitting the analog reset values from the first row of pixels (block 340), image senor 100 generates an optional "Middle of Row" synchronization signal, and then begins to generate and transmit analog signal values from the first row of pixels (block 350), which are also transmitted as current values as described above and received and stored by host device 210 (block 352). After storing the pixel values for the first row (at this time the decision in block 354 is "NO"), host device 210 resets the row data buffer for receiving analog values for the second row of pixels (block 332). Upon receiving both analog reset and analog signal values for each pixel in each row associated with one frame of data (at this time the decision in block 354 is "YES"), host device 210 reconstructs the sensor clock and matches reset/signal values for each pixel, and then calculates a received light value for each of the pixels in each row to generate image data for one frame (block 356). Referring to the right side of FIG. 3, upon completing the transmission of analog signal values for the first row, the address counter is incremented (block 360) and the measure/transmit operation is repeated for the second row ("NO" in block 362, which returns control to block 330). An optional "Start of Row" synchronization signal is generated and transmitted to host device 210 at the beginning of the second row measurement (block 330), and then reset and signal values are measured and transmitted as described above.

Referring to the bottom left side of FIG. 3, upon receiving and processing image data for each frame in block 356, host system 210 moves image data from the data table into frame data storage to prepare for the next frame. In addition, control is passed to block 320, where updated exposure data information is transmitted to image sensor 100. Referring to the bottom right side of FIG. 3, upon transmitting analog signals for each frame ("YES" in block 362), control is passed to block 322, where clock/control circuit 120 updates exposure time (if necessary) according to the DIGITAL IN control signal, then transmits a new "Start of Frame" synchronization signal (block 330), and then repeats the process of generating analog image data for the entire frame starting with the first row.

By way of example, the operation of pixel 110-10,3 (see FIG. 1) is described below with reference to the timing diagrams provided in FIGS. 4(A) to 4(D), and involves the transmission of control signals from counter/address circuit 130 to reset transistor Q1, transfer gate transistor Q2 and select switch Q4, and from column select circuit 140 to column select transistor Q5 in the following manner. NMOS reset transistor Q1 is controlled by a reset control signal RST (described below with reference to FIG. 4(A)), NMOS transfer gate transistor Q2 is controlled by a transfer gate control signal TG (described below with reference to FIG. 4(B)), select transistor Q4 is controlled by control signal SEL (described below with reference to FIG. 4(C)), and column select transistor Q4 is controlled by control signal CLMN SEL (described below with reference to FIG. 4(D)).

Figure 4A:
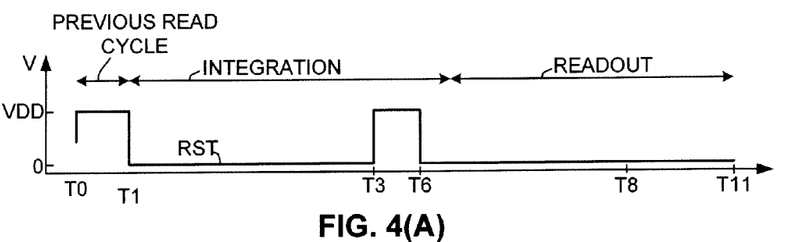
FIGS. 4(A), 4(B), 4(C) and 4(D) are timing diagrams showing control signals transmitted to a selected pixel and output circuitry of the image sensor of FIG. 1.

As indicated at the top of FIG. 4(A), each readout operation of pixel 110A includes a pre-integration (PI) phase, an integration phase, and a readout phase. Referring to the left side of FIGS. 4(A) to 4(C), during the pre-integration phase of operation (i.e., between time T0 and T1), reset control signal RST and transfer gate control signal TG are toggled high, and select control signal SEL remains low. These high control signals cause select switch Q4, transfer gate transistor Q2, and reset transistor Q1 to turn on, thereby opening a path between system voltage VDD and photodiode P that facilitates charging (resetting) photodiode P to a reset voltage.

Referring again to FIGS. 4(A) and 4(B), at the beginning of the integration phase (at time T1), reset control signal RST and transfer gate control signal TG are toggled low. These low control signals cause transfer gate transistor Q2 and reset transistor Q1 to turn off, thereby isolating photodiode P, causing a photodiode charge to decrease at a rate proportional to the amount of received light (i.e., relatively bright light causes a relatively rapid discharge, while relatively low light causes a relatively slow discharge).

A "reset level" reading is then performed near the end of the integration phase. Referring again to FIG. 4(C), after a portion the integration phase has elapsed (i.e., at time T2), select control signal SEL toggles high to turn on select switch Q4, thereby facilitating the passage of signals generated on node N2 to column select transistor Q5. A short time later (time T3, FIG. 4(A)), reset control signal RST toggles high to turn on reset transistor Q1, thereby charging gate-to-source voltage of source-follower transistor Q3 (node N1) according to the applied system voltage. The "reset level" on node N1 varies from pixel to pixel due to the Vt variation of NMOS transistors Q1 from pixel to pixel. However, performing a reset read operation before each "signal level" read operation provides a correlated pixel value (i.e., the difference between the "signal level" value and the "reset level" value). That is, a higher "reset level" value will result in a higher "signal level" value for the same amount of light collected by a given photodiode, and a lower "reset level" value will result in a lower "signal level" value for the same amount of light collected by that photodiode. A first sample/hold operation is performed between time T4 and T5 by asserting column select control signal CLMN SEL (see FIG. 4(D)) while reset signal RST is turned on, and then reset control signal RST is toggled low (time T6, FIG. 4(A)).

Figure 4B:
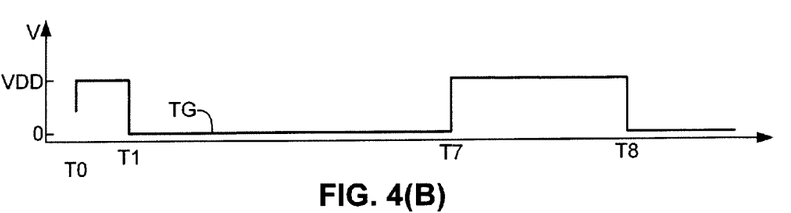
Figure 4C:
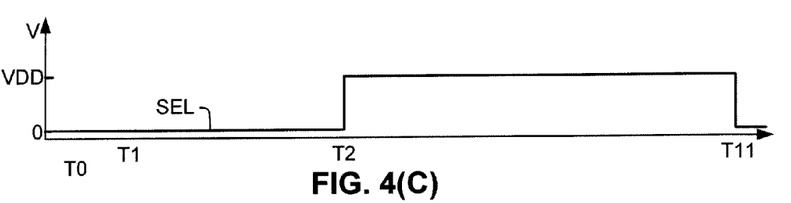
Figure 4D:
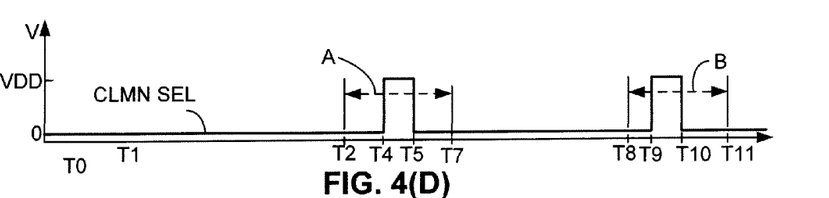

A readout phase of the operation is then performed to read a "signal level" value associated with photodiode P in response to the light received during the integration phase. Referring to FIG. 4(B), transfer gate control signal TG is asserted beginning at time T7, which turns on transfer gate Q2 to couple photodiode P to node N1. After a predetermined time period for allowing the photodiode charge to collect on parasitic capacitance C, a second sample/hold operation is performed between time T9 and T10 by asserting column select control signal CLMN SEL (see FIG. 4(D)) to read this "signal level" value. In one embodiment, transfer gate Q2 is turned off at time T8, prior to the second sample/hold operation, to match pre-integration and post-integration channel feedthrough of transfer transistor Q2. Select switch Q4 is subsequently turned off (time T11; see FIG. 4(C)) to end the readout phase.

As described above, in accordance with an aspect of the present invention, analog reset level and signal level values for each row of pixels are transmitted in separate sets from images sensor 100 to host device 210 during separate time periods. For example, referring again to FIG. 4(D), all of the pixels in the row including pixel 110-10,3 (see FIG. 1) generate reset level values during a first time period, e.g., between time T2 and T7 (indicated by dashed line A), and these reset level values are transmitted at different times during this first time period by turning on associated column select transistors associated with each pixel in the row. Subsequently, all of the pixels in that row generate signal level values during a second time period, e.g., between time T and T7 (indicated by dashed line A), and these reset level values are transmitted at different times during this first time period by turning on associated column select transistors associated with each pixel in the row. Similarly, reset level signal sets (bursts) and signal level signal sets are transmitted from each of the pixels in each row during the generation of each frame of image data.

Figure 5:
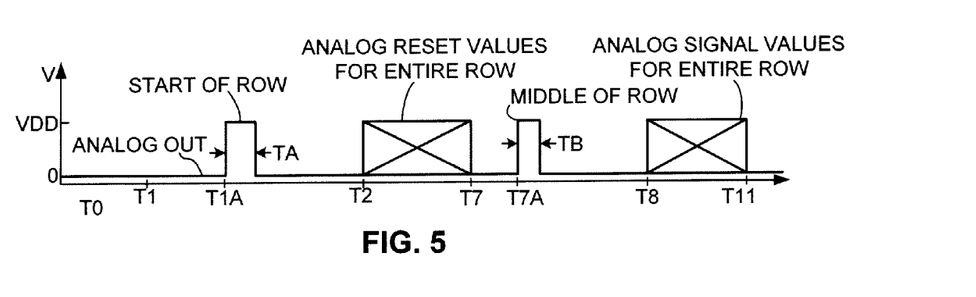
FIG. 5 is a simplified timing diagram showing analog output signals transmitted to the output pad of the image sensor of FIG. 1 during operation according to an embodiment of the present invention.

FIG. 5 is a timing diagram illustrating the generation of synchronization signals associated with the transmission of a row of image data according to another embodiment of the present invention. As mentioned above, a "Start of Row" synchronization signal is transmitted on the analog output signal (i.e., onto contact pad PAD4) at a time (e.g., time T1A) prior to the transmission of the burst including analog reset values for each row. In addition, a "Middle of Row" synchronization signal is transmitted on the analog output signal at a time T7A occurring between the first burst including the analog reset values (which end at time T7) and the beginning of the second burst including analog signal values for that row (which begin at time T8). In accordance with an aspect of the present embodiment, the "Start of Row" and "Middle of Row" synchronization signals differ from each other in duration or signal strength in order for host device 210 to recognize and identify which synchronization signal is being sent on the analog output signal. For example, as indicated in FIG. 5, the "Start of Row" synchronization signal has a duration TA that is longer than a duration TB associated with the "Middle of Row" synchronization signal. In an alternative embodiment, these synchronization signals may be characterized by different analog voltage or current levels (i.e., different "analog values").

Figure 6:
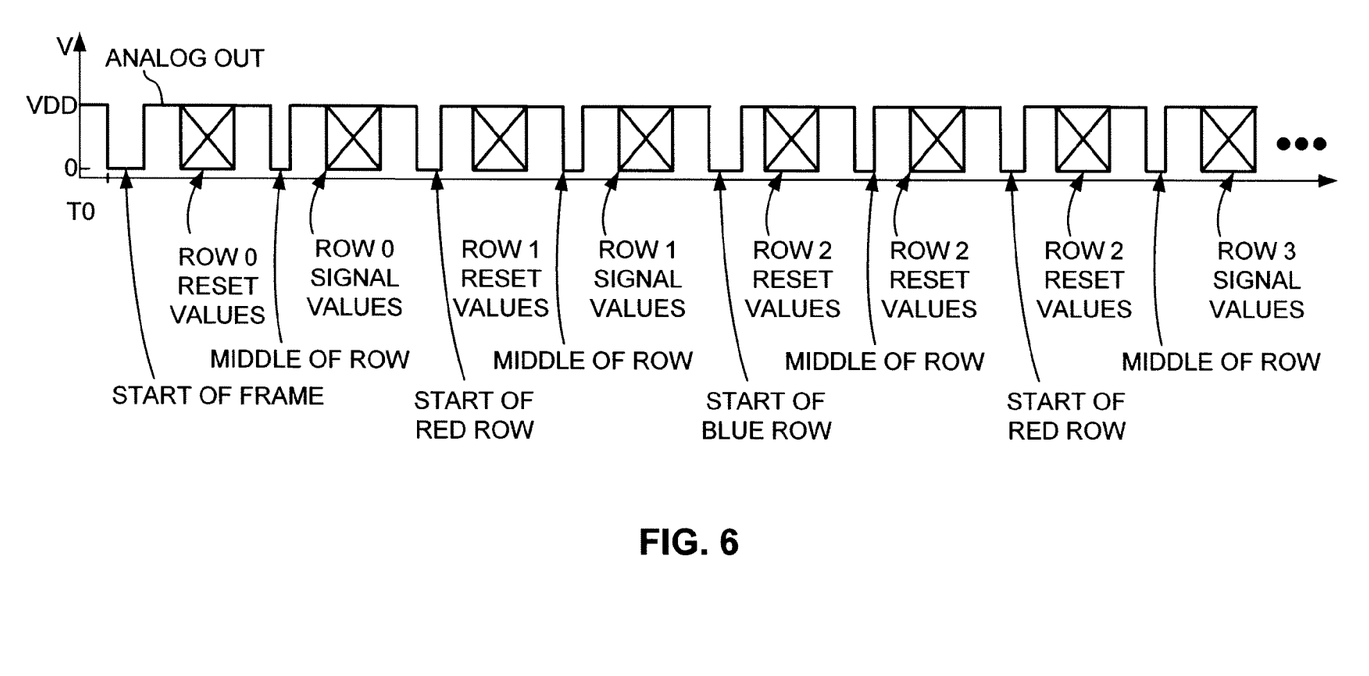
FIG. 6 is a simplified timing diagram showing analog output signals transmitted by the image sensor to the host device in of the endoscopic system of FIG. 2 according to another specific embodiment of the present invention.

FIG. 6 is a timing diagram illustrating the analog output signal generated by image sensor 100 associated with the transmission of multiple rows of image data according to yet another embodiment of the present invention. In this embodiment, color filters are disposed over the pixel array in a Bayer pattern such that alternating rows of pixels include red filters and blue filters. Referring to the left end of FIG. 6, in the manner described above, a "Start of Frame" signal is transmitted onto contact pad PAD4 at an initial time T0, followed by a first set (burst) of analog reset values for a first row (ROW 0), followed by a "Middle of Row" synchronization signal, and followed by a second burst including analog signal values for the first row. Next, depending on whether the second row includes red filters or blue filters, either a "Start of Red Row" or "Start of Blue Row" synchronization signal is transmitted onto contact pad PAD4. In this embodiment, the next row (ROW 1) includes red filters, so the transmitted synchronization signal is "Start of Red Row", followed by followed by a third set (burst) including analog reset values for a second row (ROW 1), followed by another "Middle of Row" synchronization signal, and followed by a fourth burst including analog signal values for the second row. The next row (ROW 2) includes blue filters, so the transmitted synchronization signal is "Start of Blue Row", followed by followed by a fifth burst including analog reset values for a third row (ROW 2), followed by another "Middle of Row" synchronization signal, and followed by a sixth burst including analog signal values for the third row. This pattern is then repeated for each red row and blue row until the entire frame is processed. As suggested by the earlier embodiments described above, a more simple protocol could have been created, such as using a single Start of Row signal. However, the extra signals associated with this embodiment allow the controlling software (i.e., implemented by host device 210) to know more precisely what exactly the sensor is outputting at each moment. That means whether reset level values or signal level values are being read out, and also whether odd or even row are being read out, which differ due to Bayer pattern color implementation. This is important since the sensor is capturing images continuously.

Although the present invention has been described with respect to certain specific embodiments, it will be clear to those skilled in the art that the inventive features of the present invention are applicable to other embodiments as well, all of which are intended to fall within the scope of the present invention. For example, although the present invention is described with reference to endoscopic applications, the CMOS image sensor of the present invention may be utilized in any application requiring a very small image sensor.

The invention claimed is:

1. A CMOS image sensor comprising:
   a semiconductor chip including a metal output pad disposed for connection to an external conductor;
   a plurality of pixels fabricated on the chip, each pixel including a photodiode and a plurality of transistors coupled between the photodiode and an associated signal line;
   a clock generation circuit disposed on the semiconductor chip for generating an on-chip clock signal;
   means for controlling the plurality of pixels such that, during a first time period, a first set of pixels of the plurality of pixels transmits onto an associated first signal line a first set of analog reset values determined by a reset voltage generated inside said first pixel, and such that, during a second time period subsequent to the first time period, said first set of pixels transmits onto said associated first signal line a first set of analog signal values according to a charge stored on said photodiode in accordance with an amount of received radiance;
   means for transmitting said set of first analog reset values from said first signal line onto said output pad during said first time period, and for transmitting said first set of analog signal values from said first signal line onto said output pad during said second time period; and
   means for transmitting a first synchronization signal onto said output pad prior to said first time period, and for transmitting a second synchronization signal onto said output pad between said first time period and said second time period.

2. The CMOS image sensor of claim 1, wherein the semiconductor chip has a maximum width and length dimension of 0.7 mm or less.

3. The CMOS image sensor of claim 1, wherein the semiconductor chip has a maximum width and length dimension of 0.5 mm or less.

4. The CMOS image sensor of claim 1, further comprising means for transmitting a synchronization signal onto said output pad during one of (a) prior to said first time period, (b) between said first and second time periods, and (c) after said second time period.

5. The CMOS image sensor of claim 1,
   wherein said plurality of pixels are arranged in an array comprising a plurality of rows and a plurality of columns, wherein said means for controlling the plurality of pixels comprises means for causing a first row of pixels including said first pixel to sequentially transmit a first set of said analog reset values onto associated signal lines during said first time period, and for causing said first row of pixels to transmit a first set of said analog signal values onto said associated signal lines during said second time period, and wherein said means for transmitting includes means for sequentially transmitting the first set of said analog reset values from said associated signal lines to said output pad during the first time period, and for sequentially transmitting the first set of said analog signal values from said associated signal lines to said output pad during the second time period.

6. The CMOS image sensor of claim 5, further comprising means for transmitting a synchronization signal onto said output pad during one of (a) prior to said first time period, (b) between said first and second time periods, and (c) after said second time period.

7. The CMOS image sensor of claim 1, wherein said semiconductor chip comprises only four contact pads including said output pad.

8. The CMOS image sensor of claim 7, wherein said means for controlling the plurality of pixels includes means for receiving a system voltage from a first contact pad of said four contact pads, a ground voltage from a second contact pad of said four contact pads, and a digital control signal from a third contact pad of said four contact pads.

9. The CMOS image sensor of claim 8, wherein said means for controlling the plurality of pixels includes means for controlling a sensor light exposure time per frame in accordance with said digital control signal.

10. A CMOS image sensor comprising:
a semiconductor chip including a metal output pad disposed for connection to an external conductor;
a plurality of pixels fabricated on the chip, each pixel including a photodiode and a plurality of transistors coupled between the photodiode and an associated signal line; and
means for controlling the plurality of pixels such that, during a first time period, a first pixel of the plurality of pixels transmits onto an associated first signal line a first analog reset value determined by a reset voltage generated inside said first pixel, and such that, during a second time period subsequent to the first time period, said first pixel transmits onto said associated first signal line a first analog signal value according to a charge stored on said photodiode in accordance with an amount of received radiance; and
means for transmitting said first analog reset value from said first signal line onto said output pad during said first time period, and for transmitting said first analog signal value from said first signal line onto said output pad during said second time period,
wherein said plurality of pixels are arranged in an array comprising a plurality of rows and a plurality of columns,
wherein said means for controlling the plurality of pixels comprises means for causing a first row of pixels including said first pixel to sequentially transmit a first set of said analog reset values onto associated signal lines during said first time period, and for causing said first row of pixels to transmit a first set of said analog signal values onto said associated signal lines during said second time period, wherein said means for transmitting includes means for sequentially transmitting the first set of said analog reset values from said associated signal lines to said output pad during the first time period, and for sequentially transmitting the first set of said analog signal values from said associated signal lines to said output pad during the second time period, wherein the CMOS image sensor further comprises means for transmitting a synchronization signal onto said output pad during one of (a) prior to said first time period, (b) between said first and second time periods, and (c) after said second time period, and wherein said means for transmitting said synchronization signal onto said output pad comprises at least one of means for transmitting one of a "Start of Frame" and "Start of Row" signal prior to said first time period, and means for transmitting a "Middle of Row" signal between said first time period and said second time period.

11. The CMOS image sensor of claim 10, wherein said means for transmitting said synchronization signals comprises transmitting said "Start of Row" signal using a first pulse width that is different from a second pulse width associated with said "Middle of Row" signal.

12. The CMOS image sensor of claim 10, wherein said means for transmitting said synchronization signals comprises transmitting said "Start of Row" signal using a first voltage level that is different from a second voltage level associated with "Middle of Row" signal.

13. A CMOS image sensor comprising:
a semiconductor chip including a metal output pad disposed for connection to an external conductor;
a plurality of pixels fabricated on the chip, each pixel including a photodiode and a plurality of transistors coupled between the photodiode and an associated signal line; and
means for controlling the plurality of pixels such that, during a first time period, a first pixel of the plurality of pixels transmits onto an associated first signal line a first analog reset value determined by a reset voltage generated inside said first pixel, and such that, during a second time period subsequent to the first time period, said first pixel transmits onto said associated first signal line a first analog signal value according to a charge stored on said photodiode in accordance with an amount of received radiance; and
means for transmitting said first analog reset value from said first signal line onto said output pad during said first time period, and for transmitting said first analog signal value from said first signal line onto said output pad during said second time period,
wherein said plurality of pixels are arranged in an array comprising a plurality of rows and a plurality of columns,
wherein said means for controlling the plurality of pixels comprises means for causing a first row of pixels including said first pixel to sequentially transmit a first set of said analog reset values onto associated signal lines during said first time period, and for causing said first row of pixels to transmit a first set of said analog signal values onto said associated signal lines during said second time period,
wherein said means for transmitting includes means for sequentially transmitting the first set of said analog reset values from said associated signal lines to said output pad during the first time period, and for sequentially transmitting the first set of said analog signal values from said associated signal lines to said output pad during the second time period, wherein the CMOS image sensor further comprises means for transmitting a synchronization signal onto said output pad during one of (a) prior to said first time period, (b) between said first and second time periods, and (c) after said second time period, wherein said CMOS image sensor comprises color filters arranged in a Bayer pattern such that red filters are disposed over selected pixels of said first row of pixels, and blue filters are disposed over selected pixels of an adjacent second row of pixels, and wherein said means for transmitting said synchronization signals comprises means for transmitting a "Start of Red Row" signal having a first analog value prior to transmitting analog reset values from said first row of pixels, and for transmitting a "Start of Blue Row" signal having a second analog value prior to transmitting analog reset values from said second row of pixels.

* * * * *

UNITED STATES PATENT AND TRADEMARK OFFICE
CERTIFICATE OF CORRECTION

PATENT NO. : 8,520,100 B2
APPLICATION NO. : 12/553880
DATED : August 27, 2013
INVENTOR(S) : Reshef et al.

Page 1 of 1

It is certified that error appears in the above-identified patent and that said Letters Patent is hereby corrected as shown below:

On the Title Page

Item (75) Inventors should read:
Raz Reshef, Tel-Aviv (IL); Erez Sarig, Hertzeliya (IL); Aviad Haber, Netania (IL);
Shay Alfassi, Kiriat Tivon (IL); Guy Yehudian, Kfar Saba (IL); Elazar Sonnenschein, Omer (IL);
Ariel Smoliar, Rehovot (IL); Yuval Malka, Beer Sheva (IL).

Signed and Sealed this
Sixth Day of September, 2022

Katherine Kelly Vidal
*Director of the United States Patent and Trademark Office*